April 2, 1940.    W. P. HUNT    2,195,861
BORING MACHINE
Filed Dec. 31, 1937
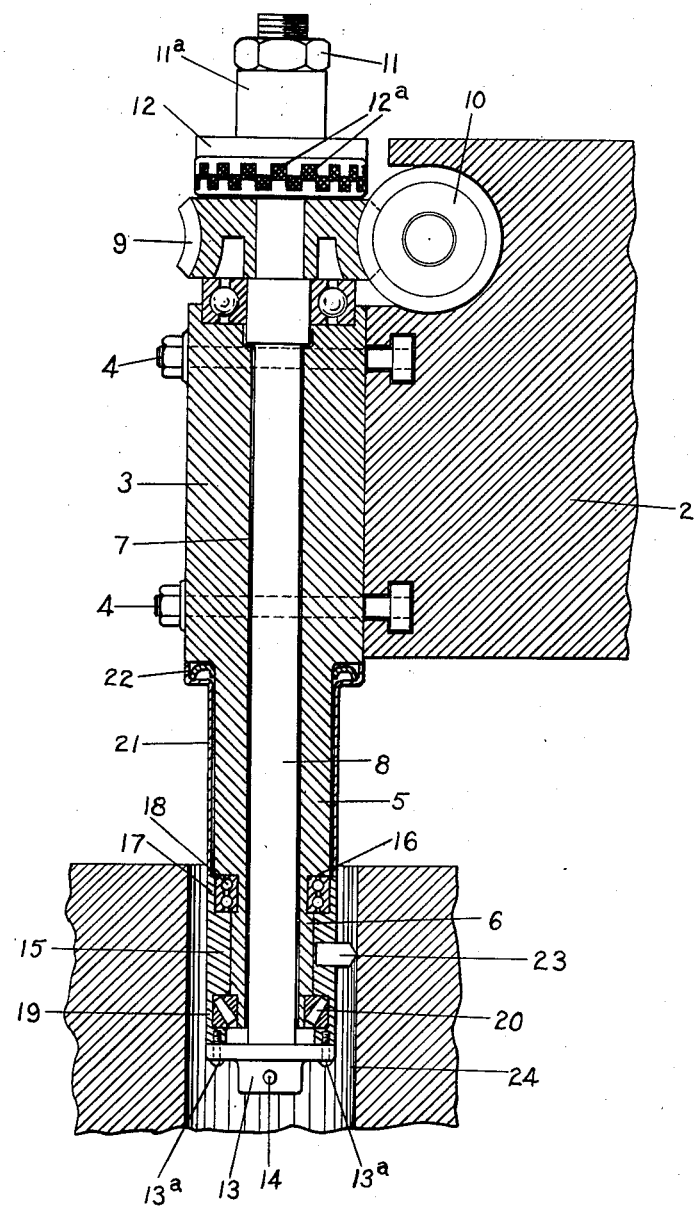
INVENTOR.
Wilson P. Hunt.
BY Walter N. Haskell,
his ATTORNEY.

Patented Apr. 2, 1940

2,195,861

UNITED STATES PATENT OFFICE 2,195,861

BORING MACHINE

Wilson P. Hunt, Moline, Ill., assignor to Moline Tool Company, Moline, Ill.

Application December 31, 1937, Serial No. 182,822

2 Claims. (Cl. 77—4)

My invention has reference to a boring machine of that type which are known as fine boring instruments, and which are designed for the use of diamond or tungsten carbide cutting elements, and it has for its chief purpose to increase the efficiency and delicacy of operation of such devices.

Another purpose thereof is to support the boring tool on the outer face of a rotatable member, and in balanced position between two anti-friction units. By the construction shown a steadier operation is secured, with less vibratory action, and greater precision in the movement of the tool. A tool that is supported midway a pair of bearings is subject to only one-half the error of a tool that is overhung at the end of a shaft.

Instruments of the kind mentioned are generally employed in multiple form, but as set forth herein only one of the units of a boring machine is shown and described.

Another purpose of the invention is to have the operative parts fully enclosed, with the enclosures forming retainers for oil, and insuring a constant supply of oil to the working parts.

The particular construction, arrangement and mode of operation of the various parts of the invention will more fully appear from the following specification, taken in connection with the accompanying drawing, the single figure of which is a vertical longitudinal section of a boring machine embodying the invention, as the same appears when in use. The disclosure herein is for the preferred form of the instrument, it being understood that changes can be made in the construction and manner of operation thereof without departing from the spirit of the invention, as set forth and claimed herein.

The reference number 2 indicates a fragmentary section of the main frame or rail of a boring or drilling machine, of usual type, to which is secured a mounting 3, by means of bolts 4. Said mounting is projected downwardly into a bearing 5, ending in an extension 6 of reduced diameter. The parts of the mounting are integrally formed, and extending through the same is a bore 7, in which is rotatably supported a shaft 8, on the upper end of which is fixed a worm-gear drive 9, in mesh with a worm pinion 10 mounted rotatably in a space in the rail 2. The upper end of the shaft 8 is threaded, and provided with a nut 11 and sleeve 11ª, between which and the worm-gear 9 is a bearing 12, including elastic cushioning members 12ª, tending to support the shaft yieldably and with a minimum of vibration.

Secured to the lower end of the shaft 8 is a disk 13, by means of a pin 14 passing through said shaft and a boss on the disk. Supported on said disk is a sleeve 15, attached thereto by means of screws 13ª, and extending upwardly from said disk to a shoulder 16 formed at the lower end of the bearing 5. In the upper end of the sleeve 15 is an annular channel 17, containing ball bearings 18, and near the lower end of the sleeve is a similar space 19, for the use of similar ball bearings 10 or roller bearings, as indicated at 20.

Enclosing the bearing 5 is a shell 21, extending from the upper end of the sleeve 15 to a shoulder formed at the lower end of the mounting 3, at which point is secured an oil seal ring 22. Oil introduced into the bore 7 from above will work downwardly to the end of the shaft 8, and upwardly between the end portion 6 and sleeve 15.

At a point about half way between the antifriction devices 18 and 20 the sleeve 15 is provided in its outer wall with a seat for a tool 23, which may be of diamond or carboloy material. When the shaft 8 is being rotated the movement thereof is imparted to the sleeve 15, giving a circular movement to the tool, for cutting on the inner face of the bore of a cylinder, or other machine part, as indicated at 24. The part operated upon is known as the "work," and as the operation continues a relative movement is imparted to the work and instrument carrying the cutting tool, causing a progressive operation in the wall of the part engaged by the tool. By this means the fine boring of a cylinder or other bore can be quickly and effectively carried on, and with a maximum amount of precision.

If desired, the shell 21 may be omitted, and the oil seal ring positioned at the upper end of the sleeve 15.

The worm pinion 10 is of sufficient length for the operation of a number of the tools, positioned for multiple operation, as is common with machines of that class.

Upon the removal of the pin 14 the disk 13 and sleeve 15 can be drawn downwardly and disconnected from the mounting, and by a reversal of such operation they can be returned to position. By this means changes can be made in the tools, if desired.

While the tool has been shown with the operating shaft in a vertical position, it will be obvious that changes can be made in the positioning thereof, to adapt the same to different kinds of work.

What I claim, and desire to secure, is:

1. In a fine boring instrument, a mounting having a vertical bore, and provided with a reduced end portion, a shaft rotatably mounted in said bore, a sleeve rotatably mounted on said end portion and operatively connected with said shaft, anti-friction bearings in the ends of said sleeve between said sleeve and the reduced end portion of the mounting, a fine cutting tool in the wall of said sleeve midway the anti-friction devices, a closure at the lower end of said shaft which directs lubricant feeding downwardly along said shaft to the interior of said sleeve, and means for rotating said shaft.

2. A fine boring instrument, comprising a mounting, having a reduced end portion, a pair of anti-friction bearings on the outer face of said reduced portion at opposite ends thereof, a cylindrical member supported at its ends for rotation on said bearings, a fine cutting tool on the periphery of said cylindrical member intermediate its ends, a shaft rotatably supported in said mounting and operatively connected with said cylindrical member, and means for rotating said shaft.

WILSON P. HUNT.